United States Patent Office 3,851,064
Patented Nov. 26, 1974

3,851,064
DIPHENYLSULFIDES AS HYPOLIPIDEMICS
Mario G. Buzzolini, Convent Station, N.J., assignor to Sandoz-Wander, Inc., Hanover, N.J.
No Drawing. Continuation-in-part of abandoned application Ser. No. 318,030, Dec. 26, 1972. This application Oct. 9, 1973, Ser. No. 404,196
Int. Cl. A61k 27/00
U.S. Cl. 424—337
11 Claims

ABSTRACT OF THE DISCLOSURE

Certain hydroxy diphenylsulfides, e.g., 4,4'-thiodiphenol, are useful as hypolipidemic agents.

This application is a continuation-in-part of U.S. patent application Ser. No. 318,030, filed Dec. 26, 1972, now abandoned.

This invention relates to the pharmaceutical activity of diphenyl sulfide derivatives. More particularly, this invention concerns the use of hydroxy substituted diphenylsulfides in the treatment of lipidemia in mammals. The invention also relates to pharmaceutical compositions containing the above compounds as an active ingredient thereof.

The active agents with which this invention is concerned may be represented by the following structural formula:

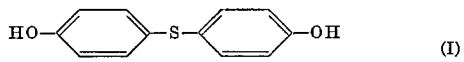

or pharmaceutically acceptable salts thereof.

Preferred compounds of formula I are 4,4-thiodiphenol and its sodium salt.

The compounds of formula I above are known and may be prepared according to methods disclosed in the literature from known materials. The pharmaceutical acceptable salts include the alkali metal salts, in particular, the sodium and potassium salts and the alakline earth metal salts, such as the magnesium and calcium salts. These salts may also be prepared by methods disclosed in the literature. The present invention contemplates only the novel use of such compounds in pharmaceutical applications, particularly as hypolipidemic agents.

As previously indicated, the compounds of formula (I) are useful because they possess pharmacological activity in animals, e.g., mammals. In particular, the compounds of formula (I) are useful as hypolipidemic agents in the treatment of lipidemia, in particular, hyperlipoproteinemia as indicated by the fall in cholesterol and/or triglyceride levels in male albino Wistar rats weighing 110-130 g. initially. The rats are maintained on drug-free laboratory chow diet for seven days and then divided into groups of 6 to 10 animals. Each group with the exception of the control is then given the compound orally at a dose of 7.5, 30, 250 or 500 milligrams per kilogram of body weight per day, p.o. for six days. At the end of this period, the animals are anesthetized with sodium hexobarbital and bled from the carotid arteries. Serum or plasma samples are then extracted with isopropanol, and the cholesterol and triglyceride content of the extracts is estimated on a Technicon Autoanalyzer by standard methodology. For example, 1.0 ml. of serum is added to 9.0 ml. redistilled isopropanol. Two autoanalyzer cupsful of a mixture of zeolite-copper hydroxide and Lloydds reagent (Kersler, E., and Lederer, H., 1965, Technicon Symposium, Madiad Inc., New York, 345-347) are added, and the mixture is shaken for 1 hour. Cholesterol levels are determined using this sample by the standard Technicon N 24A (cholesterol) methodology. The mean total serum cholesterol levels are then computed and the hypocholesterol-emic activity is expressed as the fall in cholesterol levels as a percentage of the control level. For the triglyceride determination, blood samples are collected as above and 1.0 ml. samples of the serum are added to 9.0 ml. redistilled isopropanol. Two autoanalyzer cupsful of a mixture of zeolite-copper hydroxide and Lloydds reagent (Kessler, G., and Lederer, H., 1965, Technicon Symposium, Mediad Inc., New York, 345-347) are added, and the mixture is shaken for one hour. After centrifugation, 2 ml. of the clear supernates are evaporated to dryness and saponified by addition of 0.1 ml. 10% KOH in 90% ethanol and 1.0 ml. Skelly B (petroleum ether b.p. 60-70°). After acidification and the removal of fatty acids with petroleum ether, the aqueous phases are neutralized, suitably diluted with water, and analyzed for glycerol by the method of Lofland (Anal. Biochem. 9, 393, 1964) using the Technicon Autoanalyzer. The change in serum triglyceride levels induced by the drug is computed as a percentage of the control triglyceride levels.

For such usage, the compounds are administered orally as such or admixed with conventional pharmaceutical carriers. They may be administered in such forms as tablets, dispersible powders, granules, capsules, syrups and elixirs. The compositions may contain one or more conventional adjuvants, such as sweetening agents, flavoring agents, coloring agents and preserving agents, in order to provide an elegant and palatable preparation. Tablets my contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintergration and absorption in the gastro-intestinal tract and thereby provide a sustained action over a longer period. Similarly, oral liquids, e.g. suspensions may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-o-hydroxybenzoate). Capsules may contain the active ingredient alone or admixed with an inert solid diluent, e.g., calcium carbonate, calcium phosphate and kaolin. These pharmaceutical preparations may contain up to about 90% of the active ingredient in combination with the carrier or adjuvant.

The hypolipidemic effective dosage of the compounds of formula I employed for the alleviation of lipidemia may vary depending on the particular compound employed and the severity of the condition being treated. However, in general, satisfactory results are obtained when the compounds of formula I are administered at a daily dosage of from about 2 milligrams to about 500 milligrams per kilogram of animal body weight, preferably given in divided doses two to four times a day, or in sustained release form. For most large mammals, the total daily dosage is from about 150 to about 4000 milligrams preferably 600 to 2000 milligrams. Dosage forms suitable for internal use comprise from about 37.5 to about 2000 milligrams preferably 150 to 2000 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing from about 50 to 300 milligrams of the active ingredient.

EXAMPLES 1 AND 2

Tablets and capsules suitable for oral administration

Tablets and capsules containing the ingredients indicated below may be prepared by conventional techniques and are useful in treating lipidemia at a dose of one or two tablets or capsules 2 to 4 times a day.

| Ingredient | Weight (mg.) | |
|---|---|---|
| | Tablet | Capsule |
| 4,4'-thiodiphenol | 50 | 50 |
| Tragacanth | 10 | |
| Lactose | 197.5 | 250 |
| Corn starch | 25 | |
| Talcum | 15 | |
| Magnesium stearate | 2.5 | |
| Total | 300 | 300 |

Similarly, tablets and capsules can be prepared using the disodium salt of 4,4'-thiodiphenol in place of the 4,4'-thiodiphenol at the same dosage level and used in treating lipidemia.

EXAMPLES 3 AND 4

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of hyperlipidemia. The injectable suspension is suitable for administration once a day whereas the oral liquid suspension is suitable administered 2 to 4 times per day for this purpose.

| Ingredients | Weight (mg.) | |
|---|---|---|
| | Sterile injectable suspension | Oral liquid suspension |
| 4,4'-thiodiphenol | 150 | 100 |
| Sodium carboxymethyl cellulose USP | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | q.s. |
| Color | | q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70% U.S.P | | 2,500 |
| Buffer agent to adjust pH for desired stability | Q.s. | Q.s |
| Water | (1) | (2) |

[1] For injection q.s. to 1 ml.
[2] Q.s. to 5 ml.

Similar injectable suspensions and oral liquid suspensions for use in the treatment of lipidemia may be prepared by conventional techniques using the calcium or magnesium salt of 4,4'-thiodiphenol at the above dosage levels.

EXAMPLE 5

Sterile solution for injection

The following ingredients are dissolved in water for injection and the resulting solution is filtered through an appropriate medium to form a clear solution which is then sterilized. The sterile injectable solution is suitable for administration once or twice a day in the treatment of lipidemia.

Ingredient: Weight (mg.)
Disodium salt form of 4,4'-thiodiphenol ____ 100.
Sodium alginate _____ 0.5.
Buffer system _____ As desired.
Lecithin _____ 0.5.
Sodium chloride _____ As desired.
Water for injection _____ q.s. to 1 milliliter.

EXAMPLE 6

The following formulations for syrups or elixirs containing an effective amount of active compound may be formulated using conventional methods and are administered 2 to 4 times a day in the treatment of lipidemia.

| Ingredient | Percent by weight | |
|---|---|---|
| | Syrup | Elixir |
| Disodium salt of 4,4'-thiodiphenol | 0.5-3.5 | 0.5-3.5 |
| Buffering system | Quantity sufficient to adjust pH | |
| Sodium benzoate | 0.1-0.5 | 0.1-0. |
| Flavoring agent | 0.01-0.2 | 0.01-0.5 |
| Water | 20-40 | 5-22 |
| Simple syrup U.S.P | 30-70 | 0 |
| Sorbitol solution (70%) | 10-30 | 20-60 |
| Certified dye | 0.5-2 | 0.5-0 |
| Alcohol | 0 | 2.5-22 |
| Methyl paraben | 0 | 0.05-0.0 |
| Propyl paraben | 0 | 0.05-0.1 |
| Sodium saccharin | 0 | 0.01-0.01 |

Analogous compositions to those of Examples 5 and 6 are formulated employing, in place of the disodium salt form of 4,4' - thiodiphenol the dipotassium salt form thereof.

EXAMPLES 7 AND 8

Tablets and capsules suitable for oral administration

Tablets and capsules containing the ingredients indicated below may be prepared by conventional techniques and are useful in treating lipidemia at a dose of one or two tablets or capsules 2 to 4 times a day.

| Ingredient | Weight (mg.) | |
|---|---|---|
| | Tablet | Capsule |
| 4,4'-thiodiphenol (or the disodium form thereof) | 300 | 300 |
| Tragacanth | 10 | |
| Lactose | 297.5 | 300 |
| Corn starch | 25 | |
| Talcum | 15 | |
| Magnesium stearate | 2.5 | |
| Total | 650 | 600 |

EXAMPLES 9 AND 10

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of hyperlipidemia. The injectable suspension is suitable for administration twice a day whereas the oral liquid suspension is suitable administered 2 to 4 times per day for this purpose.

| Ingredients | Weight (mg.) | |
|---|---|---|
| | Sterile injectable suspension | Oral liquid suspension |
| 4,4'-thiodiphenol (or the disodium form thereof) | 300 | 300 |
| Sodium carboxy methyl cellulose U.S.P | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70% U.S.P | | 2,500 |
| Buffer agent to adjust pH for desired stability | Q.s. | Q.s. |
| Water | (1) | (2) |

[1] For injection q.s. to 1 ml.
[2] Q.s. to 5 ml.

Compositions useful in treating lipidemia analogous to those of Examples 9 to 12 may be formulated by employing, in place of the sodium salt form of 4,4'-thiodiphenol, the dipotassium, calcium or magnesium salt form thereof.

What is claimed is:

1. A pharmaceutical composition in the form of a tablet, capsule, dispersible powder, granule, syrup or elixir useful in the treatment of lipidemia in mammals comprising as an active ingredient thereof a compound of the formula

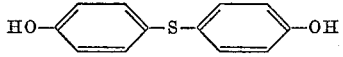

or a pharmaceutically acceptable salt thereof, and a pharmaceutically acceptable carrier therefor, said compound being present in said composition in an amount sufficient to provide a daily dosage of from about 150 milligrams to about 4000 milligrams of said compound.

2. The pharmaceutical composition of claim 1 wherein said active ingredient is present in said composition to the extent of from about 37.5 milligrams to about 2000 milligrams per unit dosage.

3. A composition according to claim 1 wherein the carrier is a solid orally ingestible carrier and the active ingredient is present in said composition to the extent of from about 50 to 300 milligrams per unit dosage.

4. A composition according to claim 1 in which the active ingredient is 4,4'-thiodiphenol.

5. A tablet according to claim 1 useful in the treatment of lipidemia in mammals comprising a hypolipidemic effective amount of a compound of the formula

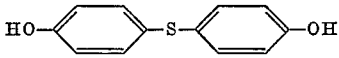 (I)

or a pharmaceutically acceptable salt thereof and a pharmaceutically acceptable carrier therefor.

6. A capsule according to claim 1 useful in the treatment of lipidemia in mammals comprising a hypolipidemic effective amount of a compound of the formula

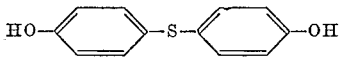

or a pharmaceutically acceptable salt thereof and a pharmaceutically acceptable carrier therefor.

7. A method for treating lipidemia, which comprises orally administering to a mammal in need of said treatment a hypolipidemic effective amount of a compound of the formula

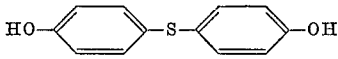

or a pharmaceutically acceptable salt thereof.

8. A method according to claim 7 wherein the compound is administered at a daily dose of from about 150 milligrams to about 4000 milligrams.

9. A method according to claim 7 wherein the compound is administered in a unit dosage form comprising said compound to the extent of from about 37.5 milligrams to about 2000 milligrams per unit dosage.

10. A method according to claim 7 wherein the compound is administered in a unit dosage form comprising said compound to the extent of from about 150 milligrams to about 2000 milligrams per unit dosage.

11. A method according to claim 7 in which the compound is 4,4'-thiodiphenol.

References Cited

Chem. Abst. 68—20483S (1968).

STANLEY J. FRIEDMAN, Primary Examiner